United States Patent
Hariharan et al.

(10) Patent No.: US 12,292,869 B2
(45) Date of Patent: May 6, 2025

(54) SYSTEM AND METHOD FOR PROCESSING ONE OR MORE ELECTRONIC DOCUMENTS FOR ENHANCED SEARCH

(71) Applicant: Quantiphi, Inc, Marlborough, MA (US)

(72) Inventors: Reghupathi Hariharan, Marlborough, MA (US); Shubham Kackar, Mumbai (IN); Palash Nimodia, Mumbai (IN); Neelesh Kumar Yadav, Mumbai (IN); V B Krishna Sai Phani Kumar Avanigadda, Mumbai (IN)

( * ) Notice: Subject to any disclaimer, the term of this patent is extended or adjusted under 35 U.S.C. 154(b) by 0 days.

(21) Appl. No.: 18/343,923

(22) Filed: Jun. 29, 2023

(65) Prior Publication Data

US 2025/0005007 A1   Jan. 2, 2025

(51) Int. Cl.
  *G06F 16/22*  (2019.01)
  *G06V 30/14*  (2022.01)

(52) U.S. Cl.
  CPC .......... *G06F 16/22* (2019.01); *G06V 30/1448* (2022.01)

(58) Field of Classification Search
  None
  See application file for complete search history.

(56) References Cited

U.S. PATENT DOCUMENTS

| | | | | |
|---|---|---|---|---|
| 2014/0236991 A1* | 8/2014 | Gulwani | ............. | G06V 30/412 707/771 |
| 2020/0160050 A1* | 5/2020 | Bhotika | ............... | G06V 30/414 |
| 2020/0273078 A1* | 8/2020 | Xu | ........................ | G06Q 30/04 |
| 2022/0222480 A1* | 7/2022 | Jiang | ..................... | G06V 10/25 |
| 2023/0169786 A1* | 6/2023 | Yuan | .................... | G06V 30/412 382/156 |
| 2024/0160953 A1* | 5/2024 | Manda | .................... | G06N 3/08 |
| 2024/0221407 A1* | 7/2024 | Hu | ................... | G06V 30/19147 |

FOREIGN PATENT DOCUMENTS

| KR | 102265678 B1 | * | 6/2021 |
| KR | 10-2301635 B1 | * | 9/2021 |

* cited by examiner

*Primary Examiner* — Augustine K. Obisesan
(74) *Attorney, Agent, or Firm* — RC Trademark Company

(57) ABSTRACT

A method for processing one or more electronic documents for enhanced search includes defining a bounding box around each key and value of key-value pairs in a first schema file, tagging coordinates of a key corresponding to a first bounding box and coordinates of a value corresponding to a second bounding box in the first schema file. Furthermore, obtaining a first inference file, detecting coordinates of a key corresponding to a third bounding box, and determining coordinates of a fourth bounding box and the value of the first inference file that are determined by applying a normalization operation. Thereafter, extracting value encompassed by the fourth bounding box of the first inference file and automatically creating a searchable index of the first inference file with searchable key-value pairs. The method achieves an efficient and accurate clustering of data items with an accurate, meaningful, and formal objective function.

18 Claims, 10 Drawing Sheets

SYSTEM AND METHOD FOR PROCESSING ONE OR MORE ELECTRONIC DOCUMENTS FOR ENHANCED SEARCH

FIELD OF TECHNOLOGY

The present disclosure generally relates to data analysis and data extraction in the field of document processing and further search and electronic document retrieval technologies. Specifically, the present disclosure relates to a method and a system for processing one or more electronic documents for enhanced search, such as through reliable extraction of key-value pairs.

BACKGROUND

Data analysis and data extraction from a document play a very crucial role for several businesses, such as insurance companies, mortgage lending companies, financial institutions, and the like. Moreover, the data analysis and the data extraction pose several significant challenges that include the identification of various document elements such as layout, headers, keys, content, and the like from the document. The process of data analysis and data extraction includes the detection and extraction of the required content that can be used to further extract the content of the document.

Conventionally, the extraction of the key-value pairs from an electronic document is accomplished using rule-based approaches or artificial intelligence (AI)-driven techniques. The rule-based approaches rely on string matches and optical character recognition (OCR) for the extraction of the data. However, such conventional rule-based approaches fail to extract the data accurately and reliably, which is not desirable. Furthermore, the AI-driven techniques employ machine learning techniques to understand document layout and structure but are found to be limited in their capabilities, for example, inconsistent results at different points in time, and are very computationally expensive.

Further limitations and disadvantages of conventional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides a method and a system for processing one or more electronic documents for enhanced search. The present disclosure seeks to provide a solution to the existing problem of incomplete and inaccurate extraction of data, such as text string, signatures, images, and the like, from the one or more electronic documents, resulting in data loss or data corruption. An aim of the present disclosure is to provide a solution that overcomes at least partially the problems encountered in the prior art and provide an improved method and an improved system for processing the one or more electronic documents that ensures accurate extraction of key and value pairs (e.g., correct text data, and other type of complicated data like signatures) from a large volume of electronic documents with no loss of data or data corruption. The disclosed method and system further ensure that almost all the text information present inside the document pages is extracted, which in turn enables user to perform enhanced search and document retrieval using the searchable key-value pairs that are accurately extracted.

In one aspect, the present disclosure provides a method for processing one or more documents for enhanced search. The method comprises defining, by a processor, a bounding box around each key and each corresponding value of a plurality of key-value pairs in a first schema file, tagging, by the processor, a set of four coordinates of a key corresponding to a first bounding box and a set of four coordinates of a value corresponding to a second bounding box in the first schema file and obtaining, by the processor, a first inference file from a client device. The method further provides detecting, by the processor, a set of four coordinates of a key corresponding to a third bounding box from the first inference file based on the set of four coordinates of the key corresponding to the first bounding box in the schema file, determining, a set of four coordinates corresponding to a fourth bounding box encompassing the value of the first inference file, wherein the set of four coordinates corresponding to the fourth bounding box encompassing the value of the first inference file are determined by applying a normalization operation using each of the set of four coordinates corresponding to the first bounding box, the second bounding box, and the third bounding box, extracting, by the processor, the value encompassed by the fourth bounding box of the first inference file and automatically creating a searchable index of the first inference file with searchable key-value pairs based on extraction of at least the value encompassed by the fourth bounding box of the first inference file.

The method involves use of two-dimensional geometrical shapes, such as bounding boxes to locate and extract the plurality of key-value pairs from the first inference file. The bounding boxes cover a relevant area encompassing each of the plurality of key-value pairs, thereby causing efficient and accurate detection of correct data to be extracted. Unlike conventional methods, the method of the present disclosure enables processing any structure of documents with the same layout for that document type. Generally, if data is not extracted correctly, it can be lost. This can lead to a number of problems, such as inaccurate reports, missed opportunities, and legal issues. Further, if data is corrupted during the extraction process, it can be unusable. This can lead to the same problems as data loss, as well as additional problems, such as the need to recreate the data. Instead of using just one point to locate a key or a value, the disclosed method employs coordinates of the four corners of bounding boxes in its processing, which significantly improves the accuracy and completeness of the data extraction of key and value pairs (e.g., correct text data, and other type of complicated data like signatures) from the inference file with no loss of data or data corruption. Further, the normalization operation in the method includes handling rotated or distorted documents, thus improved results are achieved even if the document is rotated or distorted. Furthermore, the method does not require implementation of expensive or error-prone AI based or rule-based approaches to identify the plurality of key-value pairs from the plurality of the inference files, thereby reducing processing time and cost for extraction of data from a large set of electronic documents and at the same time achieving improved accuracy and completeness of data extraction that enables a user to search and retrieve an electronic document with improved user-experience (i.e., perform an enhanced search) using the searchable key-value pairs.

In another aspect, the present disclosure provides a system for electronic a system for processing one or more documents for enhanced search, the system comprising one or more processors configured to define a bounding box around each key and each corresponding value of a plurality of key-value pairs in a first schema file, tag a set of four coordinates of a key corresponding to a first bounding box and a set of four coordinates of a value corresponding to a second bounding box in the first schema file, obtain a first inference file from a client device, detect a set of four coordinates of a key corresponding to a third bounding box from the first inference file based on the set of four coordinates of the key corresponding to the first bounding box in the schema file, determine a set of four coordinates corresponding to a fourth bounding box encompassing the value of the first inference file, wherein the set of four coordinates corresponding to the fourth bounding box encompassing the value of the first inference file are determined by applying a normalization operation using each of the set of four coordinates corresponding to the first bounding box, the second bounding box, and the third bounding box, extract the value encompassed to the fourth bounding box of the first inference file and automatically create a searchable index of the first inference file with searchable key-value pairs based on extraction of at least the value encompassed by the fourth box of the first inference file.

The system achieves all the advantages and technical effects of the method of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein:

FIGS. 4C and 4D are diagrams that depict an exemplary scenario of eliminating bounding boxes from a first inference file, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
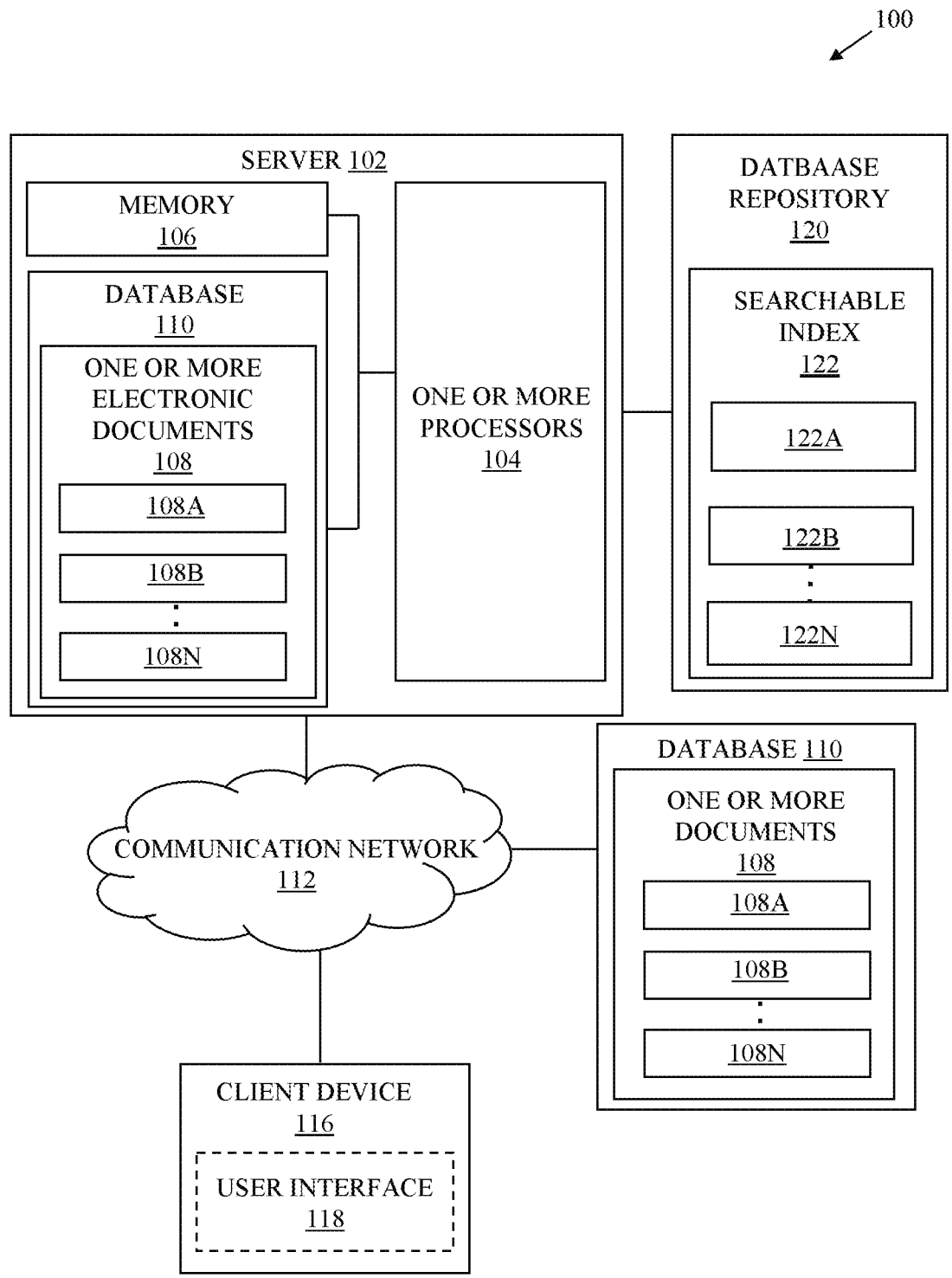
FIG. 1 is a block diagram of a system for processing one or more electronic documents for enhanced search, in accordance with an embodiment of the present disclosure.

FIG. 1 is a block diagram of a system for processing one or more electronic documents for enhanced search, in accordance with an embodiment of the present disclosure. With reference to FIG. 1, there is shown a block diagram of a system 100. The system 100 includes a server 102, one or more processors 104, and a memory 106. The one or more processors 104 are communicatively coupled with the memory 106. The system 100 may be used to electronically process the one or more electronic documents 108, such as a first electronic document 108A, a second electronic document 108B, up to an nth electronic document 108N for the enhanced search.

In an implementation, the one or more processors 104 and the memory 106 may be implemented on the same server, such as the server 102. In some implementations, the system 100 further includes a defined database, such as a database 110 communicatively coupled with the server 102 via a communication network 112. The database 110 includes the one or more electronic documents 108, such as the first electronic document 108A, the second electronic document 108B, and up to the nth electronic document 108N. In some implementations, the one or more electronic documents 108 may be retrieved from the database 110, as per requirement. In some implementations, the one or more electronic documents 108 may be stored in the same server, such as the server 102. In some other implementations, the one or more electronic documents 108, such as the first electronic document 108A, the second electronic document 108B, and up to the nth electronic document 108N may be stored outside the server 102, as shown in FIG. 1 in the database 110. Moreover, the server 102 may be communicatively coupled to a plurality of client devices, such as a client device 116, via the communication network 112. The client device 116 includes a user interface 118.

The present disclosure provides the system 100 that is configured to process the one or more electronic documents for enhanced search, such as through key-value pairs extraction. The one or more electronic documents 108, such as the first electronic document 108A, the second electronic document 108B, and up to the nth electronic document 108N may include, but is not limited to, a text document, charts and reports, legal documents, contracts and court transcripts, business documents, such as invoices and purchase orders, financial documents, bank statements and tax returns, technical manuals, insurance documents, images, videos, and the like without affecting the scope of the present disclosure.

The server 102 is configured to communicate with the client device 116 via the communication network 112. In an implementation, the server 102 may be a master server or a master machine that is a part of a data center that controls an array of other cloud servers communicatively coupled to it for load balancing, running customized applications, and efficient data management. Examples of the server 102 may include, but are not limited to a cloud server, an application server, a data server, or an electronic data processing device.

The one or more processors 104 refer to a computational element that is operable to respond to and processes instructions that drive the system 100. The one or more processors 104 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the one or more processors 104 may be an independent unit and may be located outside the server 102 of the system 100. Examples of the one or more processors 104 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 106 is configured to store the instructions executable by the one or processors 104. Examples of implementation of the memory 106 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory. Moreover, the database 110 is configured to store the one or more electronic documents 108. For example, the database 110 is configured to store the first electronic document 108A. Similarly, the database 110 is configured to store the second electronic document 108B up to the nth electronic document 108N.

The communication network 112 includes a medium (e.g., a communication channel) through which the client device 116 communicates with the server 102. The communication network 112 may be a wired or wireless communication network. Examples of the communication network 112 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

The client device 116 refers to an electronic computing device operated by a user. The client device 116 may be configured to obtain a user input of one or more words in a search portal or a search engine rendered over the user interface 118 and communicate the user input to the server 102. The server 102 may then be configured to retrieve the group of similar data items. Examples of the client device 116 may include but are not limited to a mobile device, a smartphone, a desktop computer, a laptop computer, a Chromebook, a tablet computer, a robotic device, or other user devices. Moreover, a database repository 120 refers to a database that has a well-defined schema or structure that may not have inconsistencies, errors, and redundancies in the data so that the analysis of the data becomes easy. Moreover, the database repository 120 includes a searchable index 122 of the one or more inference files, such as the first searchable key-value pair 122A of a first inference file, the second searchable key-value pairs 122B of the second inference file, up to the nth searchable key-value pairs 122N.

It should be understood by one of the ordinary skills in the art that the operations of the system 100 are explained by using the first electronic document 108A and the second electronic document 108B. However, the operation of the system 100 is equally applicable for a number of electronic documents, such as the one or more electronic documents 108.

In accordance with an embodiment, firstly a template for required pages in an electronic document may be created. Such created template then may be stored as a schema file. Any new electronic document (referred to as an inference file) for which data needs to be extracted in terms of key-value pairs, a corresponding schema file may then be identified and acquired for processing of the inference file.

Template creation or schema file creation: In this stage, a template for required pages in the document is created. A tagging user interface (also referred to as an annotator screen) may be used for tagging or annotating an electronic document.

Pre-processing: Before tagging or annotation, the input file (i.e., the electronic document) for which template is to be created may be pre-processed in a pre-processing operation. Based on the file format (e.g., pdf, png, jpg format), the input document may be converted into images in the page wise manner (for e.g., name_page1.jpg, name_page2.jpg etc.) based on the number of pages present in the input file (i.e., the electronic document). After splitting and converting the input file into images, the images may be pre-processed using a plurality of pre-processing operations to ensure good quality image (e.g., image quality above a threshold quality value) is ready for the next step, which is optical character recognition (OCR) step (where the text from the image is extracted).

Figure 4A:
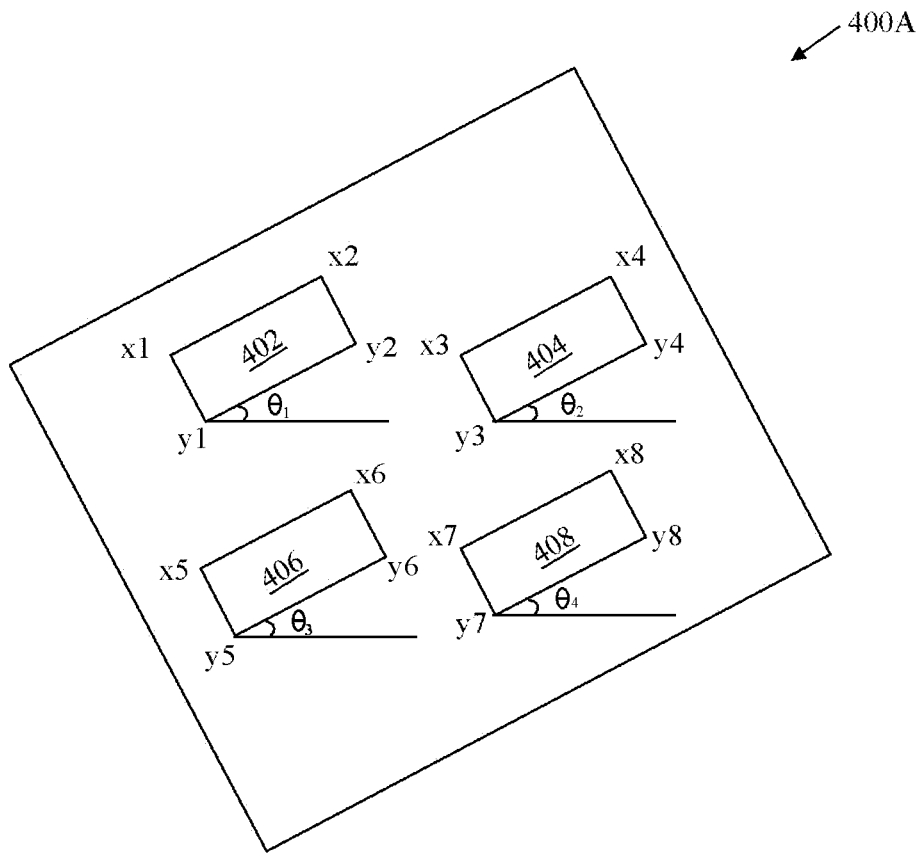
FIGS. 4A and 4B are block diagrams that depict an exemplary process for aligning of bounding boxes in the first schema file and the first inference file, in accordance with an embodiment of the present disclosure.
Figure 4B:
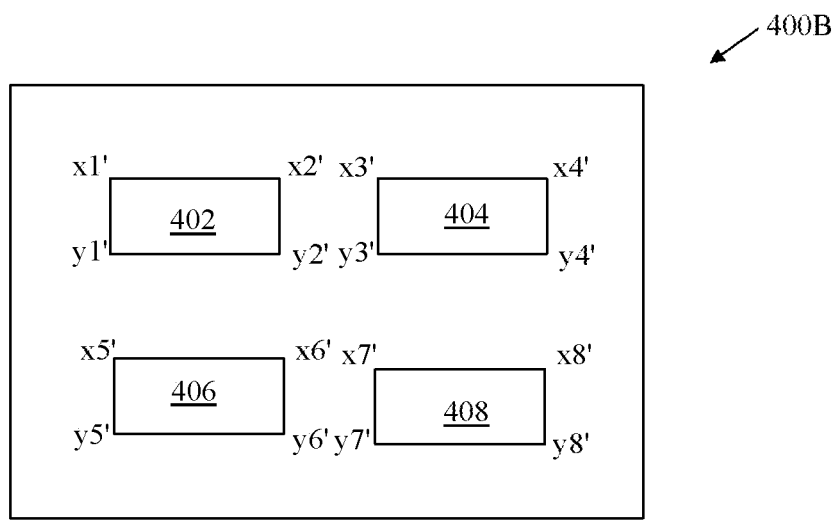

In accordance with an embodiment, the plurality of pre-processing operations may include rotation of an image to position it properly if it is not aligned properly for OCR. For instance, an angle of rotation of the image may be detected. To detect the angle of rotation, the coordinates of the texts may be used to find out the slope of each word present in the image (e.g., if text is aligned vertically instead of horizontal in an image). If the text portion is surrounded by a bounding box, coordinates of all the texts may be obtained by using the corners of bounding box as coordinates. Further, a slope of the upper line of the bounding box may be determined and this slope indicates the angle at which that the corresponding text is rotated. Similarly, the angles for all the texts may be determined and the median of the angles may be derived. This median indicates that most of the document text is rotated at this median angle, and hence the image as well is rotated at that angle. Thus, this median angle is used to rotate the images of text portion in the opposite direction to make the median angle to zero. Finally, the properly aligned image may be obtained (one example with reference to inference file is shown in FIGS. 4A and 4B, where the pre-processing is also done to align similar to the input file). Thereafter, a blur status of image may be checked and adjusted. It may also be checked that the image size is not greater than a defined size threshold (e.g., 4 MB, or 5 MB and the like). The image size helps in obtaining correct OCR. If size is less than the defined size threshold, the input image is directly passed OCR engine but if it is higher than it is down converted to the defined size threshold.

Now, coming back to the template creation, once the preprocessing and OCR extraction of the input file (i.e., the electronic document) is finished, the images of pages of the input file are loaded onto the tagging user interface. Multiple options like key values, checkboxes, tables, and signatures may be defined. The text that is going to be tagged is marked under any of these multiple options. Firstly, a key value pair option may be selected via tagging user interface and a bounding box may be defined around a text portion and a "key" tag may be assigned to it along with a custom key option. Thereafter, a value region of the corresponding key may be selected, and a bounding box may be drawn around the value portion a "value" tag may be assigned to it. In an implementation, the bounding box refers to a geometrical shape having four vertices and each vertex has a coordinate as per a pre-defined coordinate system. Once key and value both are tagged, the annotator user interface may save both text and coordinates for key portion (i.e., textual, and spatial data) and coordinates for value portion (i.e., only spatial information for value region) as a schema file (e.g., schema JSON file). Similar steps to be followed for annotating checkboxes, signatures, and tables. The annotated data is saved in the form of a schema file (e.g., a schema JSON file). The schema file is used as a reference while extracting the information from inference files which are of similar template.

In operation, the one or more processors 104 are configured to define a bounding box around each key and each corresponding value of a plurality of key-value pairs in a first schema file. In each key-value pair, the key represents a unique identifier, and the value represents an information that is associated with the corresponding key. For example, a key-value pair "Name: John Doe" includes a key "Name", along with the term "John Doe" that represents the value of the corresponding key "Name". The first schema file corresponds to a pre-defined template document that includes a pre-defined form of key-value pairs in a pre-defined format. In an example, the first schema file is a template of a form.

Figure 2A:
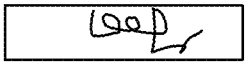
FIGS. 2A and 2B are diagrams that depict exemplary forms of a first schema file and a first inference file, in accordance with an embodiment of the present disclosure.

In an implementation, a plurality of first schema files representing a plurality of templates are stored in the memory 106 of the system 100. In an implementation, the first schema file is in a JavaScript object notation, JSON format. In an implementation, the first schema file contains one or more key value pairs, checkboxes, signatures, and the like. An exemplary format of the first schema file is shown in FIG. 2A.

In accordance with an embodiment, the first schema file is an annotated file in a pre-defined format, in which a text portion of each key and the corresponding value of the plurality of key-value pairs are stored along with the set of four coordinates. For an example, the first schema file is a template of a form, such as an admission form, survey form, insurance form and the like. In an implementation, a plurality of first schema files representing a plurality of templates can be stored in the memory 106 of the system 100, without affecting the scope of the present disclosure. In an implementation, the first schema file may be in a portable document format. PDF file, or a JavaScript object notation, JSON format and the like. In an implementation, the first schema file contains one or more key value pairs that represent text strings, checkboxes, signatures, and the like, without affecting the scope of the present disclosure. An exemplary format of the first schema file is shown in FIG. 2A.

The one or more processors 104 are further configured to identify the plurality of key-value pairs from the first schema file and draw separate bounding boxes around each key and each corresponding value. The one or more processors 104 are further configured to tag a set of four coordinates of a key corresponding to the first bounding box and a set of four coordinates of a value corresponding to the second bounding box in the first schema file. In other words, the set of four coordinates of the first bounding box of each key are tagged as a "key" and the set of four coordinates of the second bounding box of each value are tagged as a "value". For example, the one or more processors 104 are configured to tag a first coordinate, a second coordinate, a third coordinate, and a fourth coordinate of the first bounding box that is drawn around the key "Name" in the first schema file. Similarly, the one or more processors 104 are configured to tag a first coordinate, a second coordinate, a third coordinate, and a fourth coordinate of the second bounding box that is drawn around the value "John Doe" of the corresponding key in the schema file. The set of four coordinates of the first bounding box and the second bounding box determines spatial data, which indicates the position of the keys and values in the first schema file. The one or more processors 104 are configured to store textual data and spatial data (based on set of coordinates of the first bounding box) in the memory 106 for each key, whereas the one or more processors 104 are configured to store only spatial data (based on set of coordinates of the second bounding box) in the memory 106 for each value.

Figure 2B:
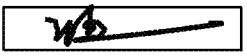

The one or more processors 104 are further configured to obtain a first inference file from the client device 116. In an implementation, the first inference file is an electronic document or file with similar layout or template as that of the first schema file. Moreover, the first inference file may be scanned document. In another implementation, the inference file may be an image PDF, a PNG image or JPEG form. In an implementation, the first inference file may include keys-value pairs that represent text strings, checkboxes, signatures, and the like. An exemplary format of the first inference file is shown in FIG. 2B. The format of the first inference file is equal or may be similar to that of the corresponding first schema file.

In order to perform further operations, the quality of the first inference file and visibility of the textual data represented through the first inference file is checked. Therefore, pre-processing of the first inference file may also be performed similar to the pre-processing operation, described above. In accordance with an embodiment, the one or more processors 104 are configured to pre-process the first inference file by splitting the first inference file into a set of images. Moreover, each image corresponds to a page of a multi-page inference file. In an implementation, if the first inference file includes "N" number of pages. Then, in that case, the one or more processors 104 are configured to split the first inference file into "N" number of images. Thereafter, the one or more processors 104 are configured to align each image of the set of images prior to an optical character recognition (OCR) operation performed on each of the set of images. The OCR operation involves conversion of an image of a text into a machine-readable text format. In order to perform OCR operation, the geometrical layout of the set of images in the first inference file is required to be aligned with the geometrical layout of the first schema file.

In accordance with an embodiment, the aligning of each image of the set of images includes determining a slope of a first line of each of the plurality of bounding boxes of the first inference file based on each set of four coordinates of the plurality of bounding boxes encompassing corresponding text strings. The first line refers to the top or upper line of a top side of a bounding box. For example, if the first line is considered to be an upper straight-line segment of one bounding box, then the upper straight-line segment of rest bounding boxes is considered to determine slope of corresponding bounding box. In an implementation, the slope of each bounding box is determined by detecting coordinates of each of the plurality of bounding boxes. For example, the first line of one bounding box in the first inference file includes coordinates (x1, y1) and (x2, y2). Here, the slope of the first line is calculated by using an equation (1) as follows:

$$\text{Slope} = \frac{y2 - y1}{x2 - x1}$$

Similarly, the slope of each bounding box is determined based on corresponding set of four coordinates of the plurality of bounding boxes.

In such embodiment, after determining slope of the first line of the bounding box, the aligning of each image of the set of images includes calculating an angle of rotation of each text string in the plurality of bounding boxes of the first inference file based on the determined slope. In an example, there are four bounding boxes for four text strings in the first inference file having slopes m1, m2, m3 and m4. Further, the angle of rotations, that is, θ1, θ2, θ3 and θ4 of the corresponding text strings are determined by applying an inverse tangent function on each slope m1, m2, m3 and m4, such as θ1=tan⁻¹ (m1), θ2=tan⁻¹ (m2), θ3=tan⁻¹ (m3), and θ4=tan⁻¹ (m4).

Furthermore, the aligning of each image of the set of images includes computing a median angle from the calculated angle of rotation for each text string in the plurality of bounding boxes. In continuation with the above example, the median angle refers to a median of the angles of rotation θ1, θ2, θ3 and θ4 of the four bounding boxes in the first inference file. Here the median angle, such as e is determined by the one or more processors 104 as:

$$\theta = \frac{\theta 2 + \theta 3}{2}$$

In one scenario, there are odd numbers of text strings in the first inference file, for example, five text strings and five angles of rotation θ1, θ2, θ3, θ4 and θ5. Therefore, the median angle θ is equal to θ3. Further, the aligning of each image of the set of images includes rotating each of the set of images to nullify the median angle. Here, each image in the first inference file is rotated by the one or more processors 104 in order to make the median angle, e equals to zero (i.e., nullifying the median angle). Due to nullifying of the median angle θ, each text string is having zero slope, that is zero angle of rotation with respect to the first schema file.

In an implementation, if the memory size of the first inference file is greater than a pre-defined threshold value (e.g., 5 Megabyte (MB), then the one or more processors 104 are configured to reduce the size of the first inference file, such as by using a compression technique, so that the OCR operation can be performed on the set of images of the first inference file. In an implementation, the compression technique involves use of the python library. In another implementation, if the set of images of the first inference file are blurry or partially visible, then, in that case, the one or more processors 104 are configured to adjust the pixels of the set of images in order to improve the quality of the set of images.

In accordance with an embodiment, the one or more processors 104 are configured to detect a set of four coordinates of a key corresponding to a third bounding box from the first inference file based on the set of four coordinates of the key corresponding to the first bounding box in the first schema file. In other words, the set of four coordinates of the key corresponding to the first bounding box in the first schema is used as reference for the detection of the set of four coordinates of the key corresponding to the third bounding box from the first inference file. The one or more processors 104 are configured to utilize the spatial data of the first bounding box to define the third bounding box.

The one or more processors 104 are further configured to determine a set of four coordinates corresponding to a fourth bounding box encompassing the value of the first inference file. The set of four coordinates corresponding to the fourth bounding box encompassing the value of the first inference file are determined by applying a normalization operation using each of the set of four coordinates corresponding to the first bounding box, the second bounding box, and the third bounding box. The set of four coordinates of the fourth bounding box are determined from the set of four coordinates of the first bounding box, the second bounding box, and the third bounding box. The normalization operation comprises adjusting the set of the four coordinates of the fourth bounding box of the first interference file to match the set of four coordinates of the second bounding box in the first schema file. Similarly, the normalization operation comprises adjusting the set of the four coordinates of the third bounding box to match the set of four coordinates of the first bounding box in the first schema file.

In an implementation, the normalization operation further includes finding a distance and a direction vector between two points in a coordinate system. For example, a first point of the two points is in the first schema file associated with a key or a value and a second point is in the first inference file associated with the same key or value as that of the first schema file. The determination of the distance and the direction vector between two points is useful for identifying the position and orientation of the key-value pairs in the first inference file based on the position and orientation of the key-value pairs in the first schema file. For example, in an exemplary scenario, the position of the "value" corresponding to a particular "key" in the first schema file is mentioned below the position of the "key" (i.e., vertical orientation) instead of positioning adjacent to the position of the "key" (i.e., horizontal orientation). In such an exemplary scenario, the direction vector is used to determine the exact position of the value with respect to the corresponding key in the first inference file. In an example, the normalization operation for determining the values in the first inference file is shown and described, in FIGS. 5A and 5B, where page corners are defined as coordinates for reference purpose.

In an implementation, the one or more processors 104 are further configured to traverse through all the words within the first inference file and detect the text strings which fall within the bounding boxes (i.e., fourth bounding box) defined through the vector-based approach. The words from the first inference file, which are positioned within the fourth bounding box are combined to form a string that matches the value that is tagged in the first schema file.

In accordance with an embodiment, the normalization operation includes adjusting the set of the four coordinates of the fourth bounding box of the first interference file to match the set of four coordinates of the second bounding box in the first schema file and adjusting the set of four coordinates of the third bounding box to match the set of four coordinates of the first bounding box in the first schema file. In other words, the normalization operation involves adapting or changing the set of four coordinates of bounding boxes in the first inference file in accordance with the set of four coordinates of bounding boxes in the first schema file. The one or more processors 104 are configured to adjust the set of four coordinates of the fourth bounding box to accommodate the words that are included in the set of four coordinates of the fourth bounding box. In an implementation scenario, the fourth bounding box is created through the set of coordinates obtained by the equation (1) or (2). Moreover, based on the length of the text string, the spatial area covered by the set of four coordinates are adjusted accordingly.

In accordance with an embodiment, the one or more processors 104 are configured to extract the value encompassed to the fourth bounding box of the first inference file and automatically creating a searchable index of the first inference file with searchable key-value pairs based on extraction of at least the value encompassed by the fourth bounding box of the first inference file. Like the value encompassed to the fourth bounding box of the first inference file is extracted, all values of all key-value pairs in the first inference file and next inference files that are processed are extracted. The searchable index refers to a list or dictionary of the key-value pairs, which are determined and extracted by the one or more processors 104 for the first inference file and all subsequently processed inference files. The searchable index enables a user to search and retrieve relevant key-value pairs accurately.

In accordance with an embodiment, extracting each key and each corresponding value of the plurality of key-value pairs in the first inference file is used to create the searchable index of the first inference file with the searchable key-value pairs. The one or more processors 104 are configured to determine the third bounding box and the fourth bounding box are used to determine the positions of the plurality of key-value pairs in the first inference file and thereafter, to extract the text strings of keys and the corresponding values from the first inference file. After that, the searchable index is created to store the extracted keys and the corresponding values. The searchable index is used to provide a list of key-value pairs that can be searched in order to retrieve any value of the corresponding key. For example, retrieving names of all the insurance holders of an insurance company.

In an implementation, the one or more processors 104 are further configured to eliminate a bounding box encompassing a key and a corresponding value of the plurality of key-value pairs in the first inference file when a number of keys in the first inference file are greater than a number of same or similar keys in the first schema file. For example, the first schema file contains three same or similar keys, such as "Name", "Father's Name" and "Mother's Name", whereas the first inference file uploaded on the system 100 by the user includes four same or similar keys, such as "Name", "Father's name", "Mother's name", and "Last name". Here, the first schema file includes three same or similar keys or three bounding boxes and the first inference file includes four same or similar keys or four bounding boxes. In such case, the one or more processors 104 are configured to eliminate the fourth bounding box, that encompasses the key "Last name" to match the layout and text strings between the first schema file and the first inference file. Advantageously, the elimination of the fourth bounding box enables the one or more processors 104 to identify the matched text strings accurately with reduced detection errors.

In an implementation, if the extracted value is a signature, then, in that case, the extracting of the value encompassed by the fourth bounding box of the first inference file further includes mapping of the signature key of the first schema file with a corresponding signature key of the first inference file. The signature key corresponds to a text string, which is indicative of a signature over the first inference file. In an example, the signature key is indicated by a term, such as "SIGNATURE" or "SIGN" and the like. The value for corresponding key "signature" corresponds to a spatial area or a region over the first inference file at which a signature of the user is to be placed while filling the details on the first inference file. In an example, the spatial area or a region indicated by a box or an underlined portion over the first inference file. In operation, the one or more processors 104 are configured to check the text string in the first inference file that matches with the key of the signature label field of the first schema file. After identification of the matching text strings (i.e., signature label field), the one or more processors 104 are configured to generate the first bounding box around the key of the "signature label field" in the first schema file and the second bounding box around the value of the signature label field in the first schema file. Moreover, the extraction of the value of the signature further includes determining normalized coordinates of the signature's spatial area or a region of the first inference file based on the mapping. The normalized coordinates are determined by the one or more processors 104 by using the KVPE logic, as mentioned in the equation (1) and (2). Moreover, the one or more processors 104 are configured to determine the normalized coordinates of the fourth bounding box enclosing the signature region of the first inference file. Further, the one or more processors 104 are configured to classify the signature region defined by the normalized coordinates by using OpenCV methods, such as by detecting tilted lines in the angle ranging from 15 to 75 degrees, in an example.

In a scenario, the first schema file and the first inference file include one or more checkboxes. Each of the checkboxes from the one or more checkboxes refers to a graphical widget on the first inference file that allows the user to choose one of the predefined options. In accordance with an embodiment, when the extracted value is a checkbox value, the extracting the value encompassed by the fourth bounding box of the first inference file further includes cropping a checkbox portion using the set of four coordinates of the fourth bounding box encompassing the value in the first inference file. In operation, the one or more processors 104 are configured to check the text strings from the first inference file, that are equal to that of the text strings which are defined as "keys" in the first schema file. Further, the one or more processors 104 are configured to generate the first bounding box around the "keys" in the first schema file and corresponding checkbox portions as "values" in the first schema file. In addition, the one or more processors 104 are configured to define the third bounding box around the text strings in the first inference file similar to that of the "keys" in the first schema file and define the fourth bounding box by finding a set of four coordinates by using the KVPE logic as mentioned in the equation (1) or (2). After defining the fourth bounding box, the one or more processors 104 are configured to crop the checkbox portion by putting the set of four coordinates as cropping points. Furthermore, the one or more processors 104 are configured for comparing white and black pixels within the cropped checkbox portion to acquire a status of the checkbox portion. The checkbox portion includes either a blank portion (in white colour) or filled portion (in black colour). The one or more processors 104 are configured to compare the white and black pixels of the cropped checkbox portion in the first inference file with that of the white and black pixels of the checkbox portion encompassed by the second bounding box in the first schema file. Further, the one or more processors 104 are configured for associating the status of the checkbox portion with a corresponding key for extracting the checkbox value. In an implementation, the association of the status of the checkbox includes calculating the angles of any lines present inside the cropped checkbox portion. The checkbox portion and corresponding key are further added into the searchable index.

In an implementation, the one or more processors 104 are configured to create a database repository of one or more inference files with the searchable key-value pairs for the enhanced search. The database repository is a centralized storage location, which is adapted to store a plurality of key-value pairs extracted by the one or more processors 104 from the one or more inference files uploaded by the user. The plurality of key-value pairs can be easily retrieved from the database repository through the user interface provided in the client device. In an implementation, the plurality of key-value pairs is stored in the form of relational database and the user provides an input query through the user interface of the client device to retrieve the plurality of key-value pairs from the database repository.

The system 100 involves use of two-dimensional geometrical shapes, such as bounding boxes to locate and extract the plurality of key-value pairs from the first inference file. The bounding boxes cover a relevant area encompassing each of the plurality of key-value pairs, thereby causing efficient and accurate detection of correct data to be extracted. Unlike conventional systems, the system 100 of the present disclosure enables processing any structure of documents with the same layout for that document type. Generally, if data is not extracted correctly, it can be lost. This can lead to a number of problems, such as inaccurate reports, missed opportunities, and legal issues. Further, if data is corrupted during the extraction process, it can be unusable. This can lead to the same problems as data loss, as well as additional problems, such as the need to recreate the data. Instead of using just one point to locate a key or a value, the disclosed system 100 employs coordinates of the four corners of bounding boxes in its processing, which significantly improves the accuracy and completeness of the data extraction of key and value pairs (e.g., correct text data, and other type of complicated data like signatures) from the inference file with no loss of data or data corruption. Further, the normalization operation handles rotated or distorted documents, thus improved results are achieved even if the document is rotated or distorted. Furthermore, the system 100 does not require implementation of expensive or error-prone AI based or rule-based approaches to identify the plurality of key-value pairs from the plurality of the inference files, thereby reducing processing time and cost for extraction of data from a large set of electronic documents and at the same time achieving improved accuracy and completeness of data extraction that enables a user to search and retrieve an electronic document with improved user-experience (i.e., perform an enhanced search) using the searchable key-value pairs.

FIGS. 2A and 2B are diagrams that depict exemplary forms of the first schema file and the first inference file, in accordance with an embodiment of the present disclosure. With reference to FIG. 2A, there is shown a first schema file 200A with a plurality of key-value pairs. In an example, the first schema file 200A is a form to be filled by patients before admitting to a hospital. The keys in the first schema file 200A are "Name", "Age", "Address", "Gender", "Male", "Female", "Others" and "Signature", whereas the values in the first schema file 200A are "Oliver Smith", "26", "East Street, New York", a checkbox for each of the keys "Male", "Female" and "Others" and the checkbox corresponding to the key "Male" is filled, a signature region associated with the key "Signature" with filled signature. The format of the first inference file 200B is equal to that of the first schema file 200A. The text strings in the first inference file 200B are same as that of the keys in the first schema file 200A, that is "Name", "Age", "Address", "Gender", "Male", "Female", "Others" and "Signature". The values corresponding to the keys in the first inference file may change based on different patients. In the first inference file 200B, the text strings corresponding for the keys "Name", "Age", "Address", "Gender", "Male", "Female", "Others" and "Signature" are "John Doe", "30", "Baker Street, London", a checkbox for each of the keys "Male", "Female" and "Others" and the checkbox corresponding to the key "Male" is filled, the signature region associated with the key "Signature" with filled signature by patient respectively.

Figures 3A, 3B:
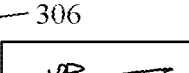
FIGS. 3A and 3B are diagrams that depict exemplary forms of the first schema file and the first inference file respectively with a plurality of bounding boxes around each text string or image, in accordance with an embodiment of the present disclosure.

FIGS. 3A and 3B are diagrams that depict exemplary forms of a first schema file and a first inference file respectively with a plurality of bounding boxes around each text string or image, in accordance with an embodiment of the present disclosure. With reference to FIG. 3A, there are shown a plurality of key-value pairs such as "NAME: Oliver Smith", "AGE: 26", "ADDRESS: East Street, New York", "GENDER: checkboxes for Male, female and others with filled checkbox for Male" and "SIGNATURE: a signature region filled with signature". In operation, the one or more processors 104 are configured to match the text strings in a first schema file 300A and a first inference file 300B and create a plurality of bounding boxes, such as a first bounding box 302 and a second bounding box 306 around the matching text strings from a first schema file 300A and a first inference file 300B respectively. Further, the one or more processors 104 are configured to create a plurality of bounding boxes, such as a third bounding box 304 and a third bounding box 308 around text strings or images (which are different from the text strings encompassed by the bounding boxes) in the first schema file 300A and the first inference file 300B respectively.

FIGS. 4A and 4B are block diagrams that depict an exemplary process for aligning of bounding boxes in the first schema file and the first inference file, in accordance with an embodiment of the present disclosure. With reference to FIG. 4A, there is shown a first inference file 400A, with four text strings, which are encompassed by four bounding boxes 402, 404, 406 and 408. The bounding box 402 has a set of four coordinates x1, y1, x2 and y2 and the bounding box 404 has a set of four coordinates x3, y3, x4 and y4. Similarly, the bounding box 406 has a set of four coordinates x5, y5, x6 and y6 and the bounding box 408 is having a set of four coordinates x7, y7, x8 and y8. In a scenario, a first line for the bounding box 402 is considered as y1 and y2, for the bounding box 404 is considered as y3, y4, for the bounding box 406 is considered as y5, y6 and for the bounding box 408 is considered as y7 and y8. The first inference file 400A is inclined in such a way that the first lines of the bounding boxes 402, 404, 406 and 408 make angles θ1, θ2, θ3 and θ4 with horizontal or standard plane. Further, the one or more processors 104 are configured to calculate the median of the angles θ1, θ2, θ3 and θ4 and rotate the first inference file in such a way to make the median of the angles θ1, θ2, θ3 and θ4 of zero magnitude. After rotation of the first inference file 400A, a new orientation 400B of the first inference file 400A is formed and a new set of four coordinates for the bounding boxes 402, 404, 406 and 408, such as (x1', x2', y1', y2'), (x3', x4', y3', y4'), (x5', x6', y5', y6') and (x7', y7', x8', y8') are generated and stored in the memory 106 of the system 100.

Figures 4C, 4D:
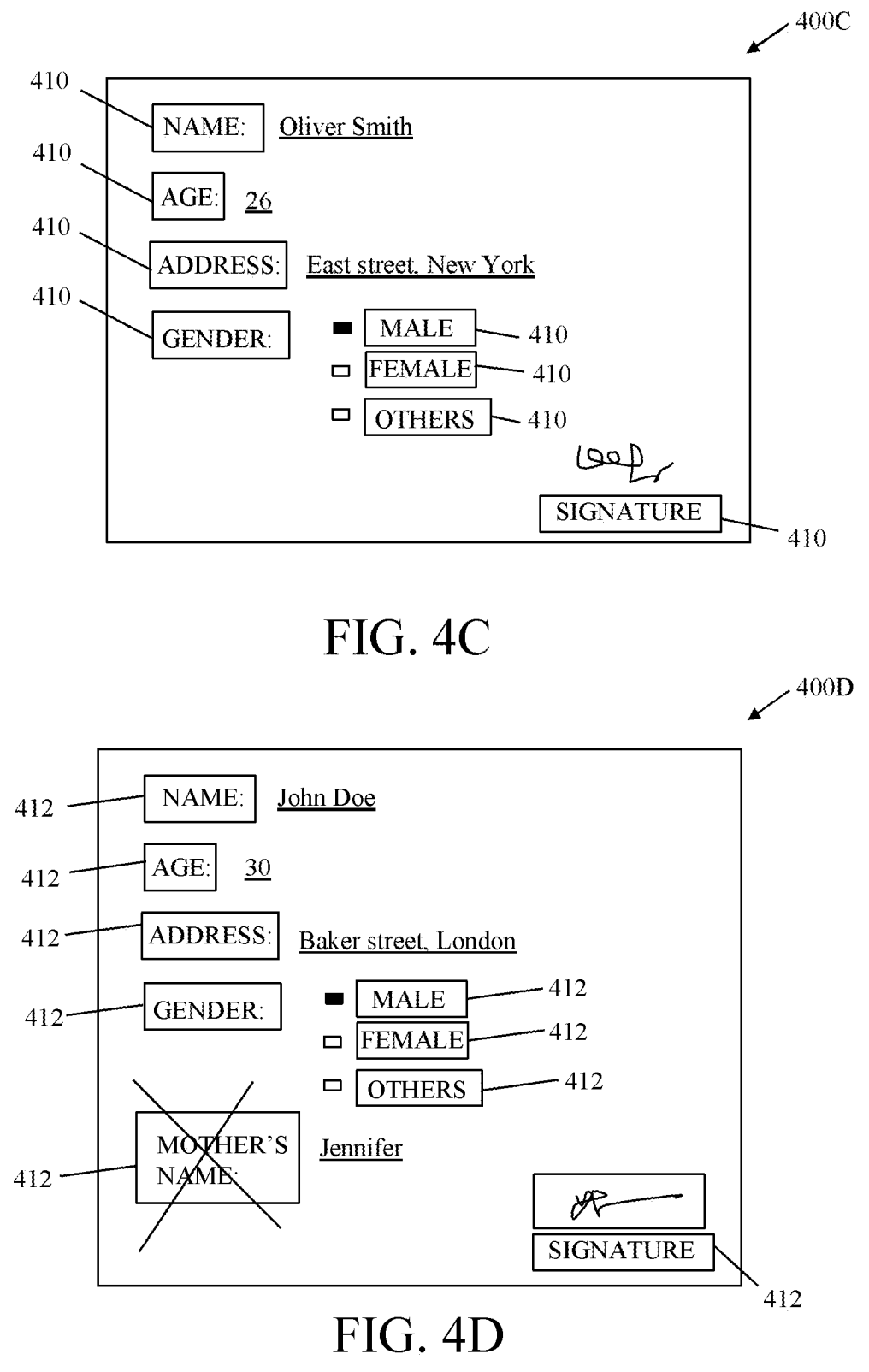

FIGS. 4C and 4D are diagrams that depict an exemplary scenario of eliminating bounding boxes from a first inference file, in accordance with an embodiment of the present disclosure. With reference to FIG. 4C, there are shown a plurality of bounding boxes 410 created by the one or more processors 104 (of FIG. 1) around text strings defined as "key" in a first schema file 400C. With reference to FIG. 4C, there are shown a plurality of bounding boxes 412 created by the one or more processors 104 around text strings defined as "key" in a first inference file 400D. Here, the number of the plurality of bounding boxes 410 in the first schema file 400C is lesser than the number of plurality of bounding boxes 412 in the first inference file 400D, due to presence of an extra text string "Mother's Name" without any matching text string in the first schema file. Therefore, the one or more processors 104 are configured to eliminate the bounding box corresponding to the text string "Mother's Name" to equalize the "key" text strings in both the first schema file 400C and the first inference file 400D.

Figure 5A:
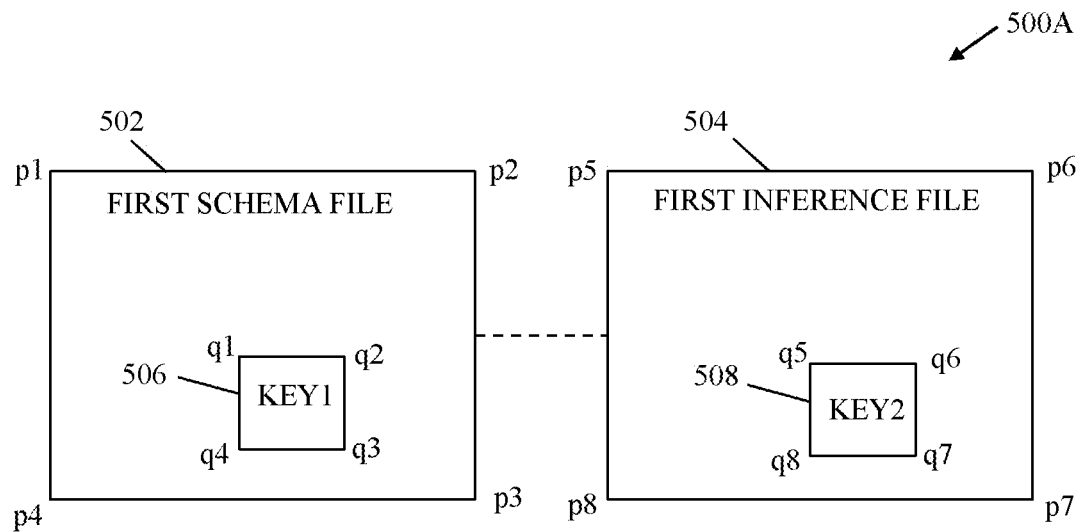
FIGS. 5A and 5B are block diagrams that depict an exemplary scenario of estimating the set of four coordinates of the third bounding box and the fourth bounding box in the first inference file, in accordance with an embodiment of the present disclosure.
Figure 5B:
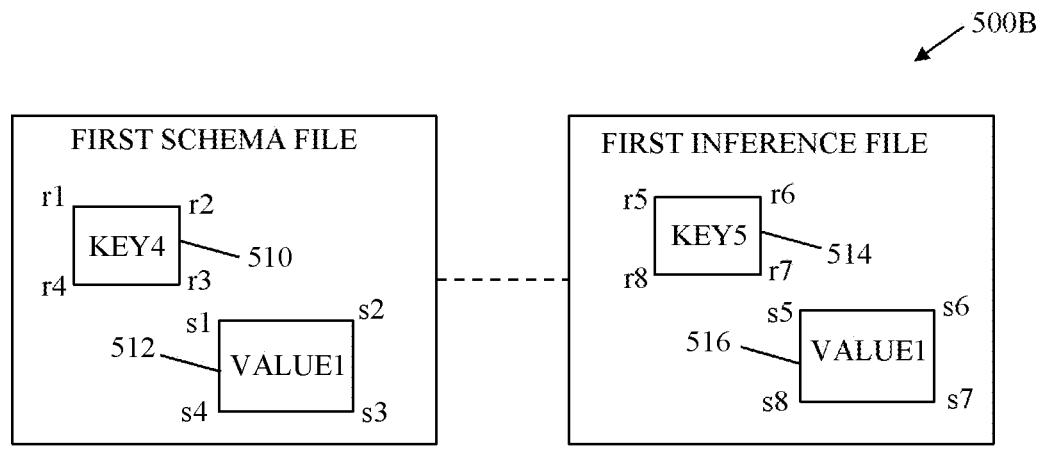

FIGS. 5A and 5B are block diagrams that depict an exemplary scenario of estimating the set of four coordinates of the third bounding box and the fourth bounding box in the first inference file by the one or more processors, in accordance with an embodiment of the present disclosure. FIGS. 5A and 5B depict the normalization operation for determining the keys in the first inference file. With reference to FIG. 5A, there is shown the first schema file with a first bounding box 502 on outer edges of a first schema file, having set of four coordinates, such as p1, p2, p3 and p4 (page coordinates of page corners). Further, the one or more processors 104 are configured to define a second bounding box 506 around the text strings, which are pre-defined as "key 1" with set of four coordinates q1, q2, q3 and q4. Further, the one or more processors 104 are configured to define a third bounding box 504 on page corners of the first inference file with set of four coordinates as p5, p6, p7 and p8. In such example, the one or more processors 104 are further configured to determine the set of coordinates of a fourth bounding box 508 to determine the text strings that correspond to "key 2" in the first inference file.

In order to determine a coordinate q5 for the fourth bounding box, the one or more processors 104 are configured to determine a distance between the two points q1 and p1. Further, the one or more processors 104 are configured to determine the direction vector of between the points p4 and p1. The direction vector of the points p4 and p1 is determined by subtracting the coordinates of the points p4 and p1. Further, the one or more processors 104 are configured to determine the magnitude of the direction vector between the points p4 and p1 by using Pythagorean theorem. In addition, the one or more processors 104 are configured to divide the direction vector between the points p4 and p1 by magnitude of the direction vector to determine a unit vector for the points p4 and p1. Further, the one or more processors 104 are configured to obtain a dot product of the distance between the two points q1 and p1 with the unit vector for the points p4 and p1. Similarly, the one or more processors 104 are configured to obtain the distance and direction vectors for the points p1 and p2 and obtain the dot product of the distance between the two points p1 and p2 with a unit vector for the points p2 and p1. The mathematical expression, that is an equation 1 for determining the magnitude of coordinate q5 is shown as:

$$q5 = p5 + \{((q1-p1)\cdot[(p4-p1)/\mathrm{mod}(p4-p1)]\times \tag{1}$$
$$[\mathrm{mod}(p8-p5)/\mathrm{mod}(p8-p5)]\times[(p8-p5)/\mathrm{mod}(p8-p5)] + ((q1-p1)\cdot[(p2\text{-}p1)/\mathrm{mod}(p2\text{-}p1)])\times$$
$$([\mathrm{mod}(p6-p5)/\mathrm{mod}(p2-p1)])\times$$
$$[(p6-p5)/\mathrm{mod}(p6-p5)]$$

Similarly, the coordinates q6, q7 and q8 are determined to define the set of coordinates q5, q6, q7 and q8 of the fourth bounding box 508. The text string present inside the fourth bounding box 508 is considered as keys for the first inference file and the text strings for the keys are stored in the memory 106 (of FIG. 1) of the system 100. Similarly, the set of four coordinates for the fourth bounding box 508 for each key in the first inference file is determined by the one or more processors 104 through the equation 1. In an implementation, the one or more processors 104 are further configured to traverse through all the words within the first inference file and detect the text strings, which fall within the bounding boxes defined through the vector-based approach (i.e., fourth bounding box). The words from the first inference file, which are positioned within the fourth bounding box 508 are combined to form a string that matches with the key that is tagged in the first schema file.

With reference to FIG. 5B, there is shown the normalization operation for determining set of four coordinates of a fourth bounding box 516 based on the set of four coordinates r1, r2, r3 and r4 of a first bounding box 510, the set of four coordinates (s1, s2, s3 and s4) of a second bounding box 512 and the set of four coordinates r5, r6, r7 and r8 of a third bounding box 514. The text corresponding to the first bounding box 510 is tagged as "key 4", the text corresponding to the second bounding box 512 is tagged as "value 1", the text corresponding to the third bounding box is tagged as "key 5". Further, the one or more processors 104 are configured to define a coordinate (s5) for the fourth bounding box 516 by using an equation 2 as follows:

$$s5 = s5 + \{((r5-r1) \cdot [(r3-r1)/\mod(r3-r1)] \times \\ [\mod(s3-s1)/\mod(r3-r1)] \times [(s3- \\ s1)/\mod(s3-s1)] + ((r5-r1) \cdot [(r2-r1)/\mod(r2-r1)]) \times \\ ([\mod(s2-s1)/\mod(r2-r1)]) \times \\ [(s2-s1)/\mod(s2-s1)] \quad (2)$$

Similarly, the coordinates s6, s7 and s8 are determined to define the set of coordinates s5, s6, s7 and s8 of the fourth bounding box 516. The text string present inside the fourth bounding box is considered as "value 1" for the first inference file and the text strings for the values of multiple first inference files are stored in the memory 106 of the system 100.

Figure 6:
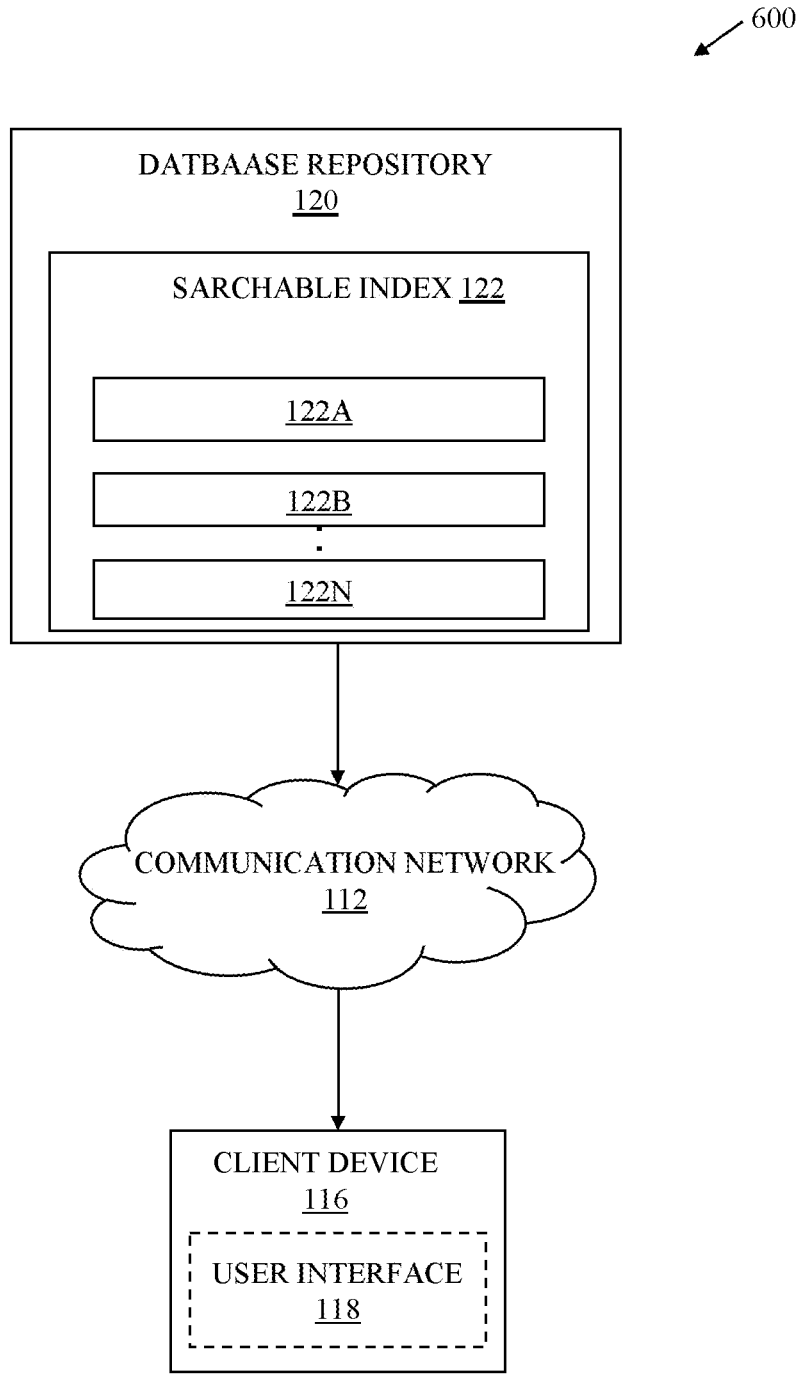
FIG. 6 is a block diagram that depicts an exemplary scenario of retracting the plurality of key-value pairs from a searchable index stored in a database repository, in accordance with an embodiment of the present disclosure.

FIG. 6 is a block diagram that depicts an exemplary scenario of retracting the plurality of key value pairs from a searchable index stored in a database repository, in accordance with an embodiment of the present disclosure. With reference to FIG. 6, there is shown an exemplary scenario 600 of the system 100 (of FIG. 1), which includes a database repository 120 (of FIG. 1). Further, the database repository 120 includes the searchable index 122 having a plurality of key-value pairs, such as a first searchable key-value pair 122A, a second searchable key-value pair 122B, up to an Nth searchable key-value pair 122N. The database repository 120 is connected to the client device 116 (of FIG. 1) through the communication network 112 (of FIG. 1). The client device 116 is provided with the user interface 118 (of FIG. 1), such as a touch screen interface, a combination of display and keyboard and the like. In order to retrieve the plurality of key-value pairs associated with a definite first inference file from the database repository, a user enters a command or query (in form of SQL) into the client device 116 through the user interface 118 to retrieve one or more of the plurality of key-value pairs. In an implementation, based on any of the plurality of key-value pairs, the user is able extract a particular document or inference file having the corresponding key-value pair. The searchable index 122 enables storing the plurality of key-value pairs in order to provide an enhanced document search.

Figure 7A:
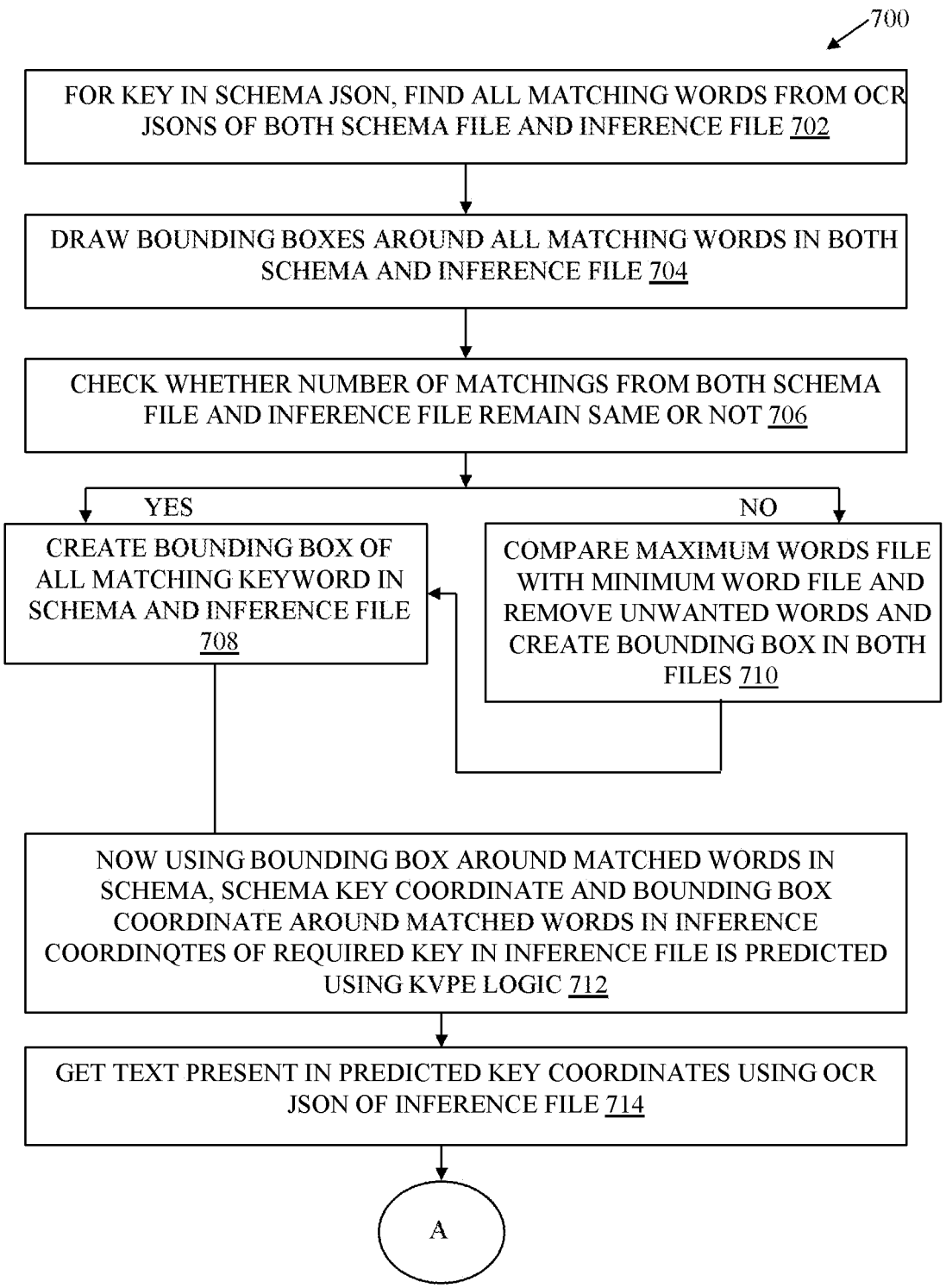
FIGS. 7A and 7B collectively is a flowchart that depicts a method for processing one or more electronic documents for enhanced search, in accordance with a different embodiment of the present disclosure.
Figure 7B:
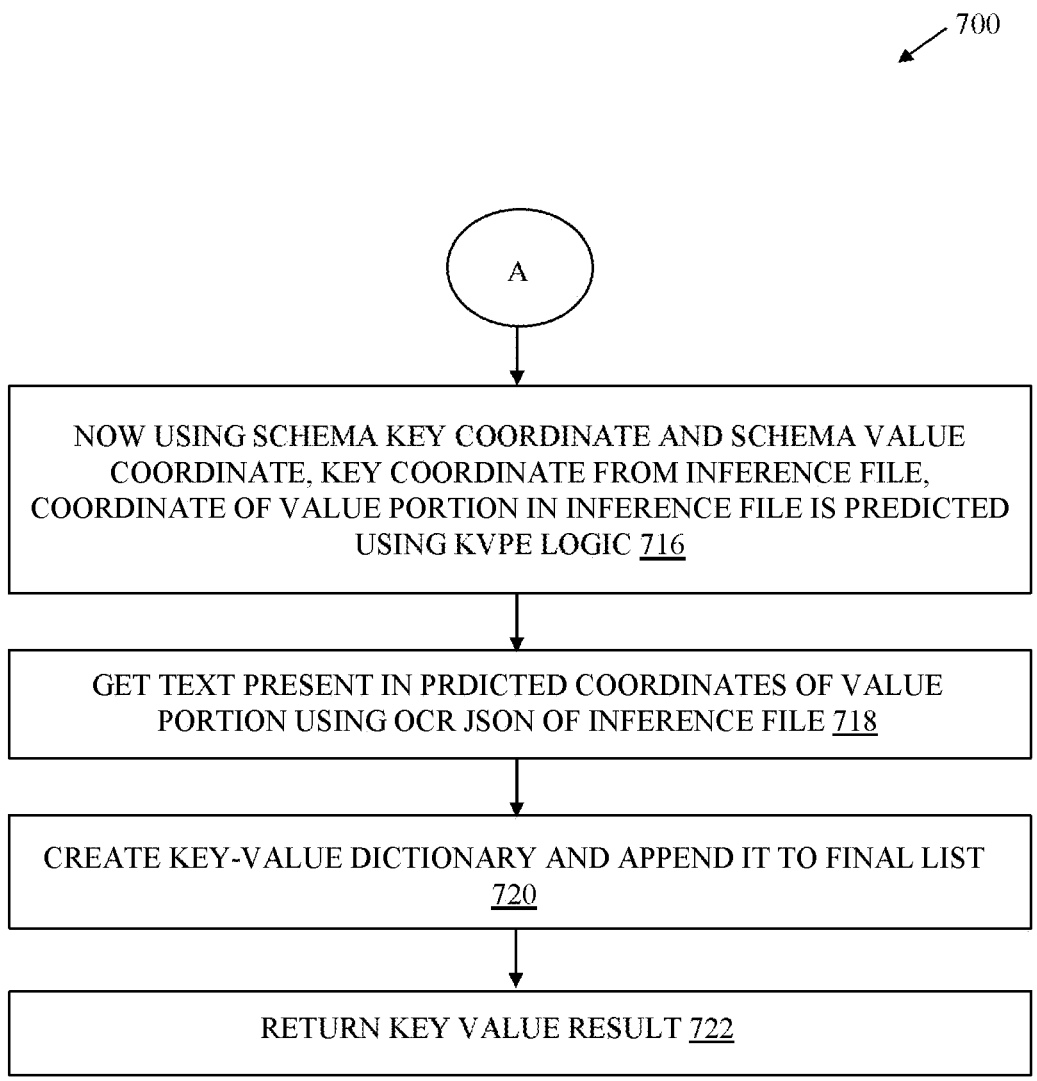

FIG. 7 is a flowchart that depicts a method for processing one or more documents for enhanced search, in accordance with a different embodiment of the present disclosure. With reference to FIG. 7, there is shown a flowchart that depicts a method 700 for processing one or more documents for enhanced search. The method 700 includes steps from 702 to 722.

At step 702, the method 700 includes finding all matching words from OCR JSONS of a first schema file and a first inference file for keys in JSON of the first schema file.

At step 704, the method 700 includes drawing bounding boxes around all matching words in the first schema file and the first inference file.

At step 706, the method 700 includes checking whether the number of matchings from both the first schema file and the first inference file remain same or not.

In case, the number of matchings from both the first schema file and the first inference file remains same, a step 708 is executed. At the step 708, the method 700 includes creating bounding boxes of all matching keywords in the first schema file and the first inference file. In case the number of matchings from both the first schema file and the first inference file does not remain same, a step 710 is executed. At the step 710, the method 700 includes compare a maximum words file (i.e., the first inference file) with a minimum words file (i.e., the first schema file), and remove unwanted words and create bounding box in both the first inference file and the second inference file. Further, the step 710 is repeated until the number of matching words in both the first schema file and the first inference file become equal. After the step 710 is completed, the step 708 is followed to create bounding boxes.

At step 712, the method 700 includes using the bounding box around matched words in the first schema file, a key coordinate in the first schema file and bounding box coordinates around matched words in the first inference file to predict coordinates of required key (i.e., the third bounding box) in the first inference file using the KVPE logic (i.e., the equation 1).

At step 714, the method 700 includes getting the text present in the predicted key coordinates of the third bounding box using OCR JSON of the first inference file.

At step 716, the method 700 includes using the key coordinates of the first bounding box and the value coordinate of the second bounding box in the first schema file, and the key coordinate of the third bounding box from the first inference file to determine the coordinates of value portion, that is the fourth bounding box in the first inference file by using the KVPE logic (i.e., equation (2)).

At step 718, the method 700 includes getting the text present in predicted coordinates of the value portion, that is, the fourth bounding box using OCR JSON of the first inference file.

At step 720, the method 700 includes creating a key-value dictionary (i.e., the searchable index) and append the key-value dictionary to a final list of key-value pairs.

At step 722, the method 700 includes returning a key-value result after providing a command or query from a user through the user interface 118 (of FIG. 1).

Figure 8:
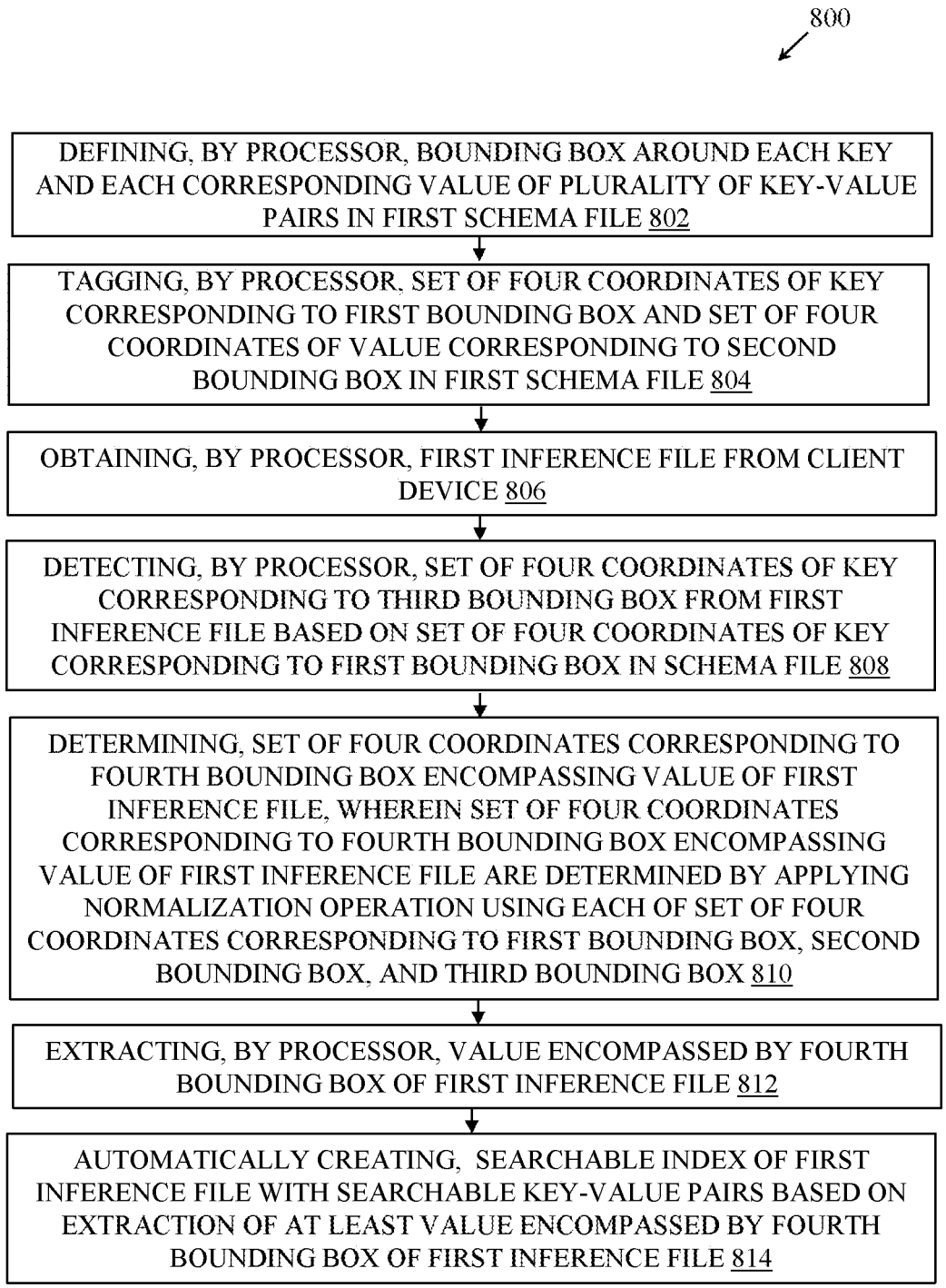
FIG. 8 is a flowchart of a method for processing one or more electronic documents for enhanced search, in accordance with an embodiment of the present disclosure.

FIG. 8 is a flowchart of a method for processing one or more documents for enhanced search, in accordance with an embodiment of the present disclosure. With reference to FIG. 8, there is shown a flowchart of a method 800 that includes steps 802-to-814. Moreover, the one or more processors 104 (of FIG. 1) are configured to execute the method 800 for the processing of the one or more documents for enhanced search.

At step 802, the method 800 includes defining, by a processor, a bounding box around each key and each corresponding value of a plurality of key-value pairs in a first schema file. The bounding box is a two-dimensional quadrilateral, such as a rectangle, a square, a parallelogram, a rhombus, a trapezoid, or the like. The plurality of key-value pairs refers to data structures that consists of two related pieces of data, such as a key and a value. The first schema file refers to a pre-defined template document, which includes data in a pre-defined layout.

At step 804, the method 800 includes tagging, by the processor, a set of four coordinates of a key corresponding to a first bounding box and a set of four coordinates of a value corresponding to a second bounding box in the first schema file. The set of four coordinates of the first bounding box of each key are tagged as a "key" and the set of four coordinates of the second bounding box of each value are tagged as a "value".

At step 806, the method 800 includes obtaining, by the processor, a first inference file from a client device. The first inference file may be a portable document format, PDF, file, an image in portable network graphics, PNG, or JPEG form. A user uploads a plurality of first inference files through the client device for extraction.

At step 808, the method 800 includes detecting, by the processor, a set of four coordinates of a key corresponding to a third bounding box from the first inference file based on the set of four coordinates of the key corresponding to the first bounding box in the schema file. The set of four coordinates of the third bounding box in the first inference file are determined from the set of four coordinates of the first bounding box by using a vector-based approach or KVPE logic.

At step 810, the method 800 includes determining a set of four coordinates corresponding to a fourth bounding box encompassing the value of the first inference file. Moreover, the set of four coordinates corresponding to the fourth bounding box encompassing the value of the first inference file are determined by applying a normalization operation using each of the set of four coordinates corresponding to the first bounding box, the second bounding box, and the third bounding box. The set of four coordinates of the fourth bounding box are determined as a function of the set of four coordinates of the first bounding box, the second bounding box, and the third bounding box. The processor is configured to perform normalization operation using the vector-based approach or KVPE logic.

Furthermore, at step 812, the method 800 includes extracting, by the processor, the value encompassed by the fourth bounding box of the first inference file. The text string or image surrounded by the fourth bounding box is determined as the value for the key enclosed in the third bounding box. The positions of the first bounding box and the second bounding box are indicative of a key-value pair in the first schema file, whereas the positions of the third bounding box and the fourth bounding box are indicative of a key-value pair in the first inference file.

At step 814, the method 800 includes automatically creating, by the processor, a searchable index of the first inference file with searchable key-value pairs based on extraction of at least the value encompassed by the fourth bounding box of the first inference file. The searchable index refers to a list or dictionary of key-value pairs, which are predicted by the processor based on the values encompassed by the third bounding box and the fourth bounding box. A user can search for required key-value pairs and/or inference files based on the key-value pairs through the user interface provided in the client device.

In accordance with an embodiment, the normalization operation in the method 200 includes adjusting the set of the four coordinates of the fourth bounding box of the first interference file to match the set of four coordinates of the second bounding box in the first schema file and adjusting the set of the four coordinates of the third bounding box to match the set of four coordinates of the first bounding box in the first schema file. The adjusting of the set of four coordinates of the third bounding box (estimated by the equation (1)) and the fourth bounding box (estimated by the equation (1)), as described in FIG. 1, are performed to accommodate complete portion of text strings, in case only partial portion of the text strings corresponding to the key and value pairs are encompassed by the third bounding box and the fourth bounding box. After adjusting the set of four coordinates of the third bounding box and the fourth bounding box, a new set of coordinates for the third bounding box and the fourth bounding box are formed and an accurate data of the key and values encompassed by the third bounding box and the fourth bounding box.

In accordance with an embodiment, the normalization operation in the method 200 further includes finding a distance between two points in a coordinate system. Moreover, the first point is in the first schema file associated with a key or a value and a second point is in the first inference file associated with the same key or value as of the first schema file. The distance between two points in the coordinate system provides information about position of the bounding boxes associated with the keys and values in the first schema file and the first inference file.

In accordance with an embodiment, the normalization operation in the method 200 further includes finding a direction vector between the two points in the coordinate system. Moreover, the first point of the two points is in the first schema file associated with the key or the value and the second point is in the first inference file associated with the same key or value as of the first schema file. The direction vector between the two points in the coordinates system is essential to identify the relative orientation of the bounding boxes of the key and values in the first schema file and the first inference file.

In accordance with an embodiment, the method 800 includes extracting each key and each corresponding value of the plurality of key-value pairs in the first inference file to create the searchable index of the first inference file with the searchable key-value pairs. The processor in the method 800 scans through the third bounding boxes and the fourth bounding boxes defined by using the equation (1) and (2) (as described in FIG. 1) and extracts the text strings or images to create the searchable index.

In accordance with an embodiment, the method 800 includes creating a database repository of one or more inference files with the searchable key-value pairs for the enhanced search. The database repository acts as a centralized storage location, which includes information about a plurality of searchable key-value pairs associated with a plurality of inference files and the user can retrieve a document based on the key-value pairs or retrieve a particular key-value pair based on an identification number associated with a particular document (i.e., the first inference file).

In accordance with an embodiment, the method 800 includes eliminating a bounding box encompassing a key and a corresponding value of the plurality of key-value pairs in the first inference file when a number of keys in the first inference file is greater than a number of same or similar keys in the first schema file. In an implementation, the processor in the method 200 traverses through all text strings from the first schema file and the first inference files and identifies matching text strings. If there are one or more extra terms or text strings mentioned in the first inference file than that of the first schema file, then the processor is configured to eliminate the extra terms or text strings in order to make the first inference file in compliance with the first schema file.

In accordance with an embodiment, the first schema file is an annotated file in a pre-defined format, in which a text portion of each key and the corresponding value of the plurality of key-value pairs are stored along with the set of four coordinates. In other words, the set of four coordinates of the first bounding box and the second bounding box along with corresponding key-value pairs are pre-defined and stored in a memory associated with the processor.

In accordance with an embodiment, the method 800 includes pre-processing of the first inference file by splitting the first inference file into a set of images. Moreover, each image corresponds to a page of a multi-page inference file and aligning each image of the set of images prior to an optical character recognition (OCR) operation performed on each of the set of images. The OCR operation involves extracting text data from an image. The text data from the set of images is extracted through the OCR operation.

In accordance with an embodiment, in the pre-processing of the first inference file performed by the processor in the method 800, the aligning of each image of the set of images includes determining a slope of a first line of each of a plurality of bounding boxes of the first inference file based on each set of four coordinates of the plurality of bounding boxes encompassing corresponding text strings. In addition, the aligning includes calculating an angle of rotation of each text string in the plurality of bounding boxes of the first inference file based on the determined slope. Furthermore, the aligning includes computing a median angle from the calculated angle of rotation for each text string in the plurality of bounding boxes and rotating each of the set of images to nullify the median angle. The aligning of the set of images makes the first inference file suitable for accurate text extraction, thereby helping in more enhanced search of the key-value pairs.

In accordance with an embodiment, when the extracted value obtained by the processor in the method 800 is a signature, the extracting of the value encompassed by the fourth bounding box of the first inference file further includes mapping a signature label field of the first schema file with a corresponding signature label field of the first inference file and determining normalized coordinates of a signature region of the first inference file based on the mapping. In an example, the signature label region corresponds to an indication for adding signature into a space associated with the signature label region. By determining the normalized coordinates of the signature region, the processor extracts the signature added into the first inference file and stores an image or text of the signature into the searchable index.

In accordance with an embodiment, when the extracted value obtained by the processor in the method 800 is a checkbox value, the extracting the value encompassed by the fourth bounding box of the first inference file further includes cropping a checkbox portion using the set of four coordinates of the fourth bounding box encompassing the value in the first inference file, comparing white and black pixels within the cropped checkbox portion to acquire a status of the checkbox portion and associating the status of the checkbox portion with a corresponding key for extracting the checkbox value. The value associated with the checkbox portion is in the form of a shading or colour. In an implementation, the value extracted from the checkbox portion is stored in the form of text string corresponding to the first inference file. For example, if a first inference file includes a highlighted checkbox portion corresponding to a key "Male" (as shown in FIGS. 2A and 2B), then the value is stored as "Male" for that first inference file.

The method 800 involves use of two-dimensional geometrical shapes, such as bounding boxes to locate and extract the plurality of key-value pairs from the first inference file to cover larger area surrounding to each of the plurality of key-value pairs, thereby causing efficient and accurate clustering of data items, such as documents, images, videos, and the like with an accurate, meaningful, and formal objective function. The bounding boxes created in the method 800 enable quick identification of documents (i.e., inference files) containing a particular key-value pair, that provides a significant advantage over conventional methods of searching and indexing. The method 800 does not require implementation of expensive AI based or rule-based approaches to identify the plurality of key-value pairs from the plurality of the first inference files, thereby reducing processing time for extraction of data from a large set of documents.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method for processing one or more electronic documents for enhanced search, the method comprising:
    defining, by a processor, a bounding box around each key and each corresponding value of a plurality of key-value pairs in a first schema file,
    tagging, by the processor, a set of four coordinates of a key corresponding to a first bounding box and a set of four coordinates of a value corresponding to a second bounding box in the first schema file;
    obtaining, by the processor, a first inference file from a client device;
    detecting, by the processor, a set of four coordinates of a key corresponding to a third bounding box from the first inference file based on the set of four coordinates of the key corresponding to the first bounding box in the schema file;
    determining, a set of four coordinates corresponding to a fourth bounding box encompassing the value of the first inference file, wherein the set of four coordinates corresponding to the fourth bounding box encompassing the value of the first inference file are determined by applying a normalization operation using each of the set of four coordinates corresponding to the first bounding box, the second bounding box, and the third bounding box;

extracting, by the processor, the value encompassed by the fourth bounding box of the first inference file; and automatically creating, by the processor, a searchable index of the first inference file with searchable key-value pairs based on extraction of at least the value encompassed by the fourth bounding box of the first inference file, wherein the first schema file is an annotated file in a pre-defined format, in which a text portion of each key and the corresponding value of the plurality of key-value pairs are stored along with the set of four coordinates.

2. The method according to claim 1, wherein the normalization operation comprises:

adjusting the set of the four coordinates of the fourth bounding box of the first interference file to match the set of four coordinates of the second bounding box in the first schema file; and adjusting the set of the four coordinates of the third bounding box to match the set of four coordinates of the first bounding box in the first schema file.

3. The method according to claim 2, wherein the normalization operation further comprises finding a distance between two points in a coordinate system, wherein a first point is in the first schema file associated with a key or a value and a second point is in the first inference file associated with the same key or value as of the first schema file.

4. The method according to claim 2, wherein the normalization operation further comprises finding a direction vector between the two points in the coordinate system, wherein the first point of the two points is in the first schema file associated with the key or the value and the second point is in the first inference file associated with the same key or value as of the first schema file.

5. The method according to claim 1, further comprising extracting each key and each corresponding value of the plurality of key-value pairs in the first inference file to create the searchable index of the first inference file with the searchable key-value pairs.

6. The method according to claim 5, further comprises creating a database repository of one or more inference files with the searchable key-value pairs for the enhanced search.

7. The method according to claim 1, further comprises eliminating a bounding box encompassing a key and a corresponding value of the plurality of key-value pairs in the first inference file when a number of keys in the first inference file is greater than a number of same or similar keys in the first schema file.

8. The method according to claim 1, further comprises pre-processing of the first inference file by splitting the first inference file into a set of images, wherein each image corresponds to a page of a multi-page inference file; and aligning each image of the set of images prior to an optical character recognition (OCR) operation performed on each of the set of images.

9. The method according to claim 8, wherein in the pre-processing of the first inference file, the aligning of each image of the set of images comprises:

determining a slope of a first line of each of a plurality of bounding boxes of the first inference file based on each set of four coordinates of the plurality of bounding boxes encompassing corresponding text strings;

calculating an angle of rotation of each text string in the plurality of bounding boxes of the first inference file based on the determined slope;

computing a median angle from the calculated angle of rotation for each text string in the plurality of bounding boxes; and rotating each of the set of images to nullify the median angle.

10. The method of claim 1, wherein when the extracted value is a signature, the extracting of the value encompassed by the fourth bounding box of the first inference file further comprises:

mapping a signature label field of the first schema file with a corresponding signature label field of the first inference file; and determining normalized coordinates of a signature region of the first inference file based on the mapping.

11. The method of claim 1, wherein when the extracted value is a checkbox value, the extracting the value encompassed by the fourth bounding box of the first inference file further comprises:

cropping a checkbox portion using the set of four coordinates of the fourth bounding box encompassing the value in the first inference file;

comparing white and black pixels within the cropped checkbox portion to acquire a status of the checkbox portion; and associating the status of the checkbox portion with a corresponding key for extracting the checkbox value.

12. A system for processing one or more electronic documents for enhanced search, the system comprising:

one or more processors configured to:

define a bounding box around each key and each corresponding value of a plurality of key-value pairs in a first schema file, tag a set of four coordinates of a key corresponding to a first bounding box and a set of four coordinates of a value corresponding to a second bounding box in the first schema file;

obtain a first inference file from a client device;

detect a set of four coordinates of a key corresponding to a third bounding box from the first inference file based on the set of four coordinates of the key corresponding to the first bounding box in the schema file;

determine a set of four coordinates corresponding to a fourth bounding box encompassing the value of the first inference file, wherein the set of four coordinates corresponding to the fourth bounding box encompassing the value of the first inference file are determined by applying a normalization operation using each of the set of four coordinates corresponding to the first bounding box, the second bounding box, and the third bounding box;

extract the value encompassed to the fourth bounding box of the first inference file; and automatically create a searchable index of the first inference file with searchable key-value pairs based on extraction of at least the value encompassed by the fourth box of the first inference file, wherein the first schema file is an annotated file in a pre-defined format, in which a text portion of each key and the corresponding value of the plurality of key-value pairs are stored along with the set of four coordinates.

13. The system according to claim 12, wherein the normalization operation comprises adjusting the set of the four coordinates of the fourth bounding box of the first interference file to match the set of four coordinates of the second bounding box in the first schema file and adjusting the set of four coordinates of the third bounding box to match the set of four coordinates of the first bounding box in the first schema file.

14. The system according to claim 12, wherein extracting each key and each corresponding value of the plurality of key-value pairs in the first inference file is used to create the searchable index of the first inference file with the searchable key-value pairs.

15. The system according to claim 12, wherein the one or more processors are further configured to eliminate a bounding box encompassing a key and a corresponding value of the plurality of key-value pairs in the first inference file when a number of keys in the first inference file is greater than a number of same or similar keys in the first schema file.

16. The system according to claim 12, wherein the one or more processors are further configured to pre-process the first inference file by splitting the first inference file into a set of images, wherein each image corresponds to a page of a multi-page inference file; and aligning each image of the set of images prior to an optical character recognition (OCR) operation performed on each of the set of images.

17. The system according to claim 16, wherein in the pre-processing of the first inference file, the aligning of each image of the set of images comprises:

determining a slope of a first line of each of a plurality of bounding boxes of the first inference file based on each set of four coordinates of the plurality of bounding boxes encompassing corresponding text strings;

calculating an angle of rotation of each text string in the plurality of bounding boxes of the first inference file based on the determined slope;

computing a median angle from the calculated angle of rotation for each text string in the plurality of bounding boxes; and rotating each of the set of images to nullify the median angle.

18. The system according to claim 12, wherein when the extracted value is a checkbox value, the extracting the value encompassed by the fourth bounding box of the first inference file further comprises:

cropping a checkbox portion using the set of four coordinates of the fourth bounding box encompassing the value in the first inference file;

comparing white and black pixels within the cropped checkbox portion to acquire a status of the checkbox portion; and associating the status of the checkbox portion with a corresponding key for extracting the checkbox value.

\* \* \* \* \*